United States Patent Office 3,400,824
Patented Sept. 10, 1968

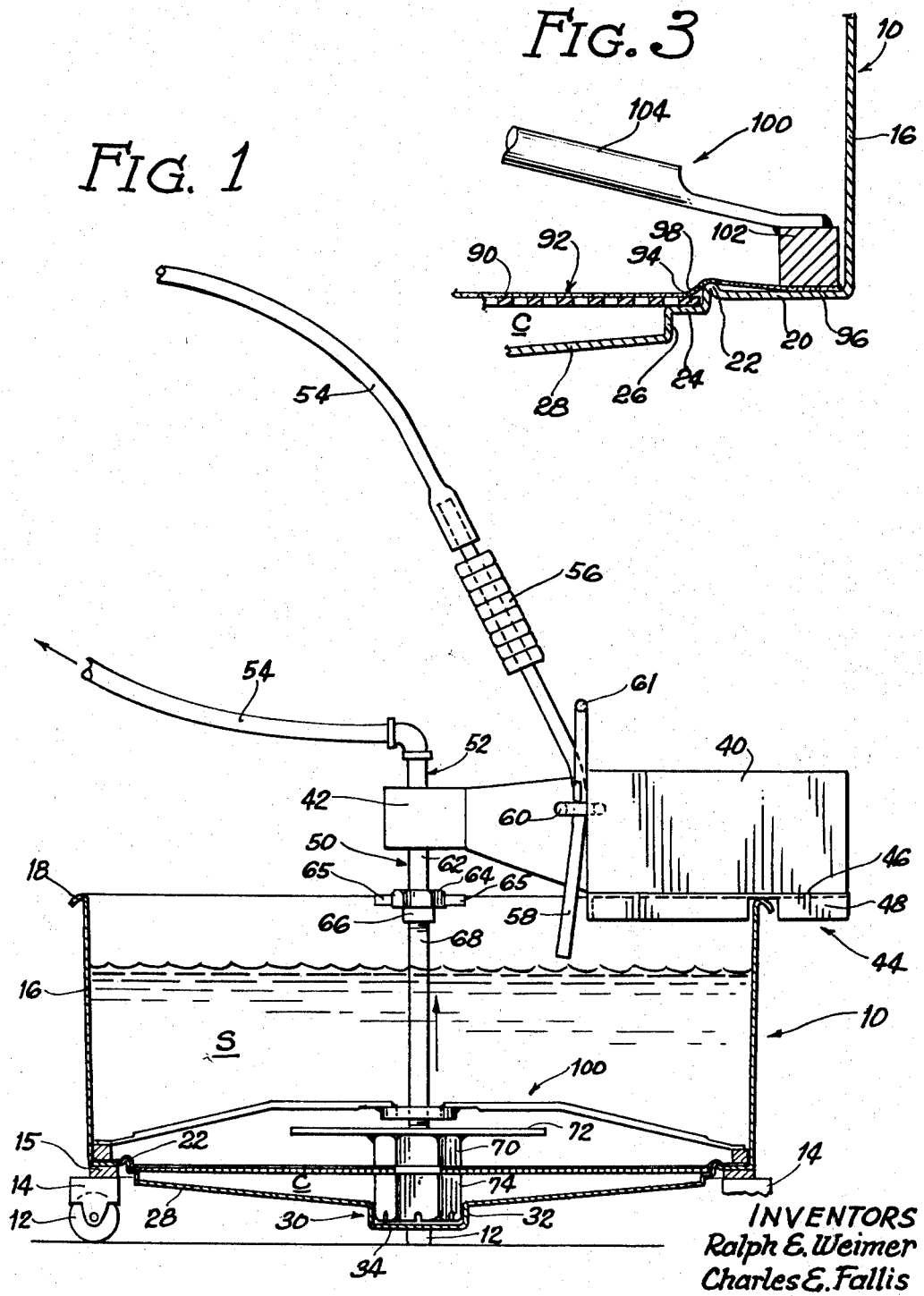

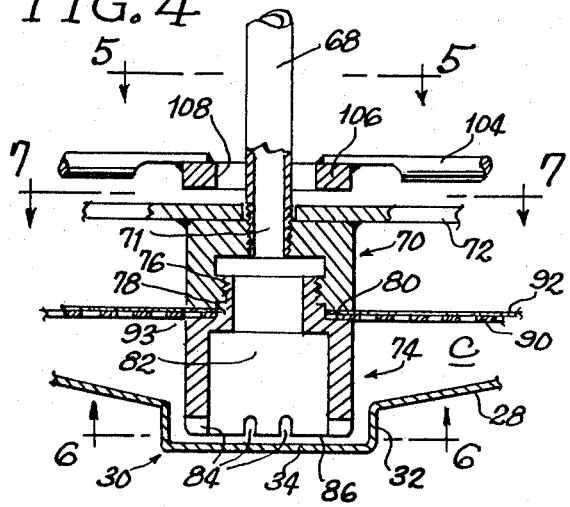
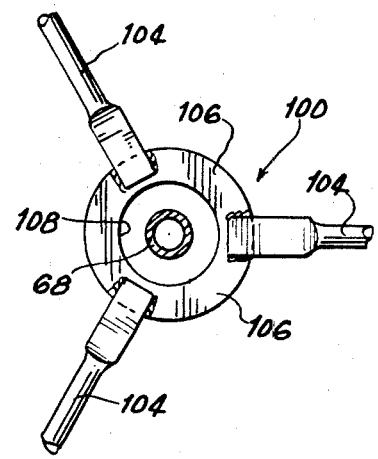
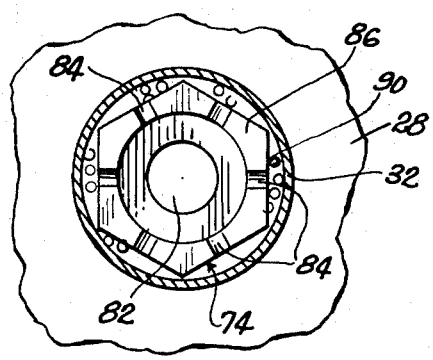
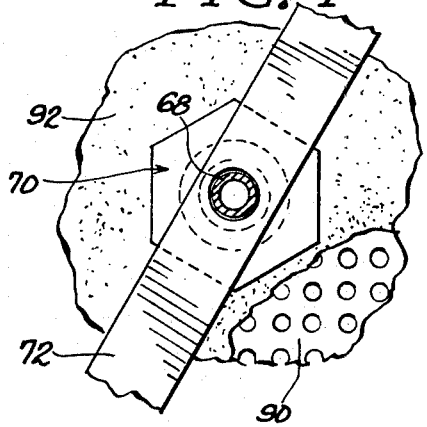
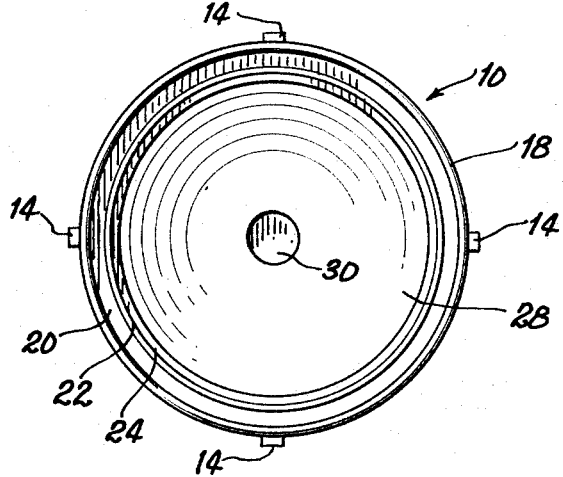

3,400,824
FILTERING APPARATUS FOR USED
COOKING OILS
Ralph E. Weimer, Lombard, Charles E. Fallis, Park Ridge, and Frank Yud, Jr., Lombard, Ill., assignors to McDonald's System, Inc., a corporation of Illinois
Filed Nov. 14, 1966, Ser. No. 593,834
5 Claims. (Cl. 210—238)

ABSTRACT OF THE DISCLOSURE

Described and illustrated herein is a portable filter for filtering used cooking oils and the like. The filtering apparatus includes a bowl having an imperforate bottom and a sump at its center from which filtrate is drawn upwardly by a suction pump. A filter screen overlies and is spaced from the bowl bottom and is supported upon a portion of the bowl bottom at its periphery. A filter paper overlying the screen sealingly engages a portion of the bowl bottom beyond the screen periphery. The suction pump is in flow communication with the sump via an intake nut extending into the sump, a releasably connected clamping nut overlying the center of the screen and an upwardly extending intake pipe, the intake and clamping nuts being adapted for easy and ready clamping engagement for removal of the filter paper.

---

This invention relates to a filtering apparatus, and is especially concerned with a portable filtering apparatus for regenerating and purifying used cooking oils.

Deep fat and other cooking baths used, for example, in restaurant operations must be cleaned and purified periodically. To allow solids and other filterable impurities to remain in such baths for the duration of the life of the cooking oils would result in a shorter usable life for the oils and would produce less desirable products.

For those reasons, portable filtering devices are used in many restaurants for periodic cleaning and regeneration of the oils and shortenings used in deep fat and cooking baths. Those devices are small, are portable and are intended to filter rapidly, essential requirements for restaurants where space and time are at a premium. Such devices should also be easy to assemble and disassemble, should be easy to clean and quite importantly should minimize the return of unfiltered fluid to the cooking bath. All of these and other prerequisites of a filtering apparatus of this class are met by filtering apparatus made in accordance with this invention.

Portable filtering devices intended for similar purposes are known. Such devices are exemplified by the devices illustrated and described in patents to Butt, U.S. Patent 2,477,404; to Mies et al., U.S. Patent 2,760,641; and to Mies, U.S. Patent 2,760,645.

At least one major disadvantage of the device of the Butt patent is that after use, cooking oils which are solid at ambient temperatures will tend to solidify in the pump and discharge lines so that blockage will occur when the device is to be used again. Devices constructed in accordance with this invention obviate those and other disadvantages of such filters.

Devices made in accordance with the Mies patents are complex. When it is understood that the user of the filtering devices must frequently disassemble them to replace the filter paper and to clean the bowls and other parts, it will become apparent that such devices should have a minimum of parts which must be separated. In accordance with this invention filtering devices are provided which have an easily disassembled and reassembled filtering assembly and devices which are adapted for the use of a single filtering screen secured to the filtering device only adjacent its center. Further the filtering screen and bowl cooperate with a filter paper to define a filtrate or suction chamber therebetween to permit a minimum of bypass of unfiltered fluid into the discharge channel. Those and other features and advantages of this invention are absent from the disclosures of the Mies patents.

Further advantages and objects of this invention will become apparent from the following description and drawings of which:

FIGURE 1 is a cross-sectional view of one embodiment of a portable filtering apparatus of this invention;

FIGURE 2 is a plan view of the bowl of FIG. 1;

FIGURE 3 is an enlarged fragmentary view of a lower corner portion of FIG. 1;

FIGURE 4 is an enlarged fragmentary view of a central portion of FIG. 1;

FIGURE 5 is a view taken substantially along the line 5—5 of FIG. 4, showing only certain portions;

FIGURE 6 is a bottom view taken substantially along the line 6—6 of FIG. 4; and

FIGURE 7 is a view taken substantially along the line 7—7 of FIG. 4.

Referring first to FIGS. 1 to 3 inclusive, an illustrative embodiment of this invention is seen to comprise a bowl 10 supported on a plurality of casters 12. Casters 12 are suitably housed in caster housings 14 which are bolted to an annular ring 15 and which forms a dolly which houses and supports bowl 10. Casters 12 facilitate easy movement of the filtering apparatus from place to place as desired.

Bowl 10 comprises an upstanding wall and a contoured base. It may be formed as by spinning and is of a sanitary material such as stainless steel or tin plated steel. The other parts of the filtering apparatus at least to the extent that they are in contact with the cooking oil may also be fabricated of such materials.

Bowl 10 is generally circular in cross-section and comprises an upstanding generally vertical wall 16 terminating at its upper edge in an outturned lip 18. At its base, wall 16 terminates in an inwardly extending generally horizontal annular shoulder portion 20. Inwardly of wall 16, shoulder portion 20 terminates in a continuous sealing ridge 22. Sealing ridge 22 extends vertically above the upper surface of shoulder portion 20, crests and then dips downwardly below the lower surface of portion 20 terminating in an annular generally horizontal shelf or flat 24. Annular flat 24 terminates inwardly in a downwardly directed extension 26 which is integrally formed with a sloped or dished floor or wall segment 28 which terminates centrally in a sump 30 defined by a side wall 32 and a floor 34.

Bowl 10 is proportioned to cooperate with and to form part of the filtering mechanism of this invention. The filtering mechanism comprises a motor 40 and a suction pump 42 which is driven by motor 40. The motor and pump are mounted on bowl 10, the motor and pump asembly being connected as by bolting to a motor support 44 which is removably seated on the top of bowl 10. Motor support 44 comprises a generally planar motor seat 46 and downwardly extending reinforcing flanges 48 which may be slotted appropriately to receive lip 18 of bowl 10, as seen in FIG. 1. The motor and pump assembly is balanced on bowl 10 and upon standpipe 68.

Pump 42 draws fluid upwardly through an intake line 50 and discharges it through a discharge line 52. Discharge line 52 may comprise a flexible hose 54, as of a sanitary and temperature resistant material, such as wire reinforced neoprene, which terminates in a handle 56 surrounding a portion of a discharge nozzle assembly. The discharge nozzle 58 may be of metal. For convenience, an eyelet 60 formed of metal and suitably connected to the housing of motor 40 may be provided to accommodate nozzle 58 when the discharge nozzle is not in use. Eyelet 60 also includes a handle portion 61 which may be used to carry and manipulate the removable pump and motor assembly.

Intake line 50 leads from sump 30 into pump 42. It comprises a nipple 62 terminating in a pump coupling nut 64 such as a union having wings 65. Coupling nut 64 removably couples a threaded fitting 66 which internally threadedly receives the upper threaded end of a hollow standpipe 68. The lower end of standpipe 68 is also threaded and is threadedly engaged internally of an intake coupling nut 70 which defines an axial bore 71. That is best seen in FIG. 4. To facilitate assembly and disassembly of certain portions of the embodiment illustrated, a wrench handle 72 is securely connected as by welding to and at the upper surface of intake coupling nut 70. Handle 72 defines a central opening of a dimension suitable to permit the lower end of standpipe 68 to pass therethrough and into threaded engagement with intake coupling nut 70. At its lower end intake coupling nut 70 is threaded internally, thereby to threadedly receive an intake means such as an intake nut 74. Intake nut 74 (best seen in FIGS. 4 and 6), as the coupling nuts referred to, may define hexagonal exteriors.

At its upper end intake nut 74 is secured to screen 90, as by welding, and is circular, is reduced in peripheral dimension and defines a threaded segment 76 proportioned to be threadedly received within intake coupling nut 70. Therebeneath intake nut 74 defines a longitudinally extending cylindrical segment 78 which terminates in a generally horizontal clamping shoulder 80 having an external periphery coincident with that of the intake nut, i.e., it is hexagonal in shape. Intake nut 74 defines a central axial bore 82, larger at its base than at the top, which is in fluid communication with bore 71 and with the standpipe bore. Bore 82 terminates within sump 30.

The base portion of intake nut 74 defines a plurality of fluid receiving inlet ports. In the embodiment illustrated those ports take the form of a plurality of radially extending channels or grooves 84 machined in the lower annular face 86 of intake nut 74. It is through ports or grooves 84 that filtrate such as filtered cooking oils may be drawn for return to the cooking bath from which it was taken for regeneration and filtration.

Although lower face 86 is shown in FIGS. 1 and 4 to be spaced slightly from floor 34 of the sump, in operation it will frequently be disposed in close adjacency thereto, thereby defining with the sump floor a plurality of closed channels for the passage of fluid or filtrate from the sump into bore 82.

Intake nut 74 and intake coupling nut 70 are proportioned to clampingly engage the filtering medium shown. The filtering medium may comprise a screen such as a perforated plate 90 and a disposable filter paper 92. Each of plate 90 and filter paper 92 define a central aperture of a dimension sufficient to receive cylindrical segment 78 of intake nut 74. The portions of the plate and paper immediately surrounding the apertures are then clamped, as by threadedly and tightly engaging the intake nut to the intake coupling nut thereby clamping those portions against the shoulder 80 of intake nut 74. To facilitate assembly and disassembly of the filtering apparatus, intake nut 74 may be spot welded to screen 90 as represented at 93.

As seen in FIGS. 1 and 3 the peripheral portion 94 of plate 90 rests upon the annular shelf or flat 24 of bowl 10 while the periphery 96 of filter paper 92 lies against shoulder portion 20 of bowl 10. An intermediate portion 98 of the filter paper contacts sealing ridge 22 and may be characterized as being sealingly draped thereover when the filtering apparatus is in use.

The peripheral portion 96 of filter paper 92 is retained in its position by a weighted compression ring 100. Compression ring 100 comprises a spider including a peripheral continuous circular outer ring segment 102, generally rectilinear in cross section, which is proportioned to urge the filter paper against shoulder portion 20. Ring segment 102 is secured by a plurality of radially extending angled spokes 104 to a central collar 106 which is circular in plan view and which defines a central opening 108 larger in diameter than standpipe 68 which it surrounds and along which it is freely movable. For convenience of connection the ends of spokes 104 are flattened and are welded to ring segment 102 and to collar 106, respectively. It is to be noted that collar 106 is spaced above the coupling nut assembly so that the entire weight of the compression ring 100 is exerted against the peripheral portion 96 of filter paper 92.

The filtering apparatus of this invention is highly effective and is easy to use. When it is understood that regenerating apparatus for filtering cooking oils is used many times weekly by many restaurant operators and that it should be cleaned each time it is used, it will be appreciated that the simplicity of assembly, of disassembly and of operation of filtering apparatus made in accordance with this invention is peculiarly advantageous.

To prepare the regenerating apparatus of the illustrated embodiment for use, the pump coupling nut is detached from threaded fitting 66 and the motor and pump assembly is removed as by using handle 61. The standpipe 68 together with compression ring 100, plate 90, paper 92 and nuts 70 and 74 are then removed by lifting them as a unit out of bowl 10. Compression ring 100 is then lifted and removed. Then the standpipe assembly including standpipe 68, threaded fitting 66 and intake coupling nut 70 are removed as a unit by rotating handle 72 relative to screen 90. The old filter paper together with the accumulated impurities and filter cake is then easily removable by simply lifting it from plate 90. After cleaning the parts as necessary and removing old shortening, a new filter paper 92 is then positioned upon plate 90, and coupling nut 70 threaded with intake nut 74 to clampingly engage the inner portion of paper 92 between plate 90 and the complementary downwardly facing lower surface portion of intake coupling nut 70. Bowl 10 is cleaned as necessary, and the entire assembly is replaced in the bowl, the standpipe threaded fitting 66 secured by pump coupling nut 64 to pump fitting 62 and the filtering apparatus is again ready for use. Of course, the periphery 96 of filter paper 92 should be smoothed so that it lies properly over bowl shoulder portion 20 and so that the intermediate paper portion 98 is properly draped over sealing ridge 22. Compression ring 100 is then allowed to rest upon and against periphery 96.

At this point the regenerating apparatus is ready for use. Cooking liquid or shortening S to be filtered is allowed to drain or is pumped into bowl 10 from a shortening bath, reservoir or receptacle, together of course, with any impurities it may contain. If the filtered shortening is to be returned to the container from which it was withdrawn, the container should be promptly cleaned. Then discharge nozzle 58 is positioned in the container to which the regenerated shortening or filtrate is to be returned and motor 40 is turned on. Pump 42 draws a suction in intake line 50, through the bores of standpipe 68 down to central bore 82 of intake nut 74 creating a zone of reduced pressure beneath filter paper 92 and the perforate plate 90, drawing shortening therethrough into filtrate chamber C. Filter plate 90 (in cooperation with filter paper 92) and the base of the bowl 10 define the suction chamber C into which filtrate is drawn for discharge through nozzle 58. The impurities are retained on the surface of filter paper 92 and the filtered shortening flows into sump 30, through grooves 84 and upwardly through central bore 82. The reduced pressure tends to bow plate 90 downwardly frequently causing the lower face 86 of intake nut 74 to come into contact with floor 34 of sump 30, thereby effectively creating flow channels defined by grooves 84 and the upper face of sump floor 34.

It should be noted that as a vacuum is first drawn, the filter paper 92 is drawn into close engagement with plate 90 throughout the portion thereof overlying plate 90. Further intermediate portion 98 of the filter paper assumes a steep draped relationship over sealing ridge 22 thereby defining with ridge 22 a substantial seal. Compression ring 100 seals the peripheral portion 96 of the filter paper against shoulder 20 thereby contributing to a seal peripherally outwardly of plate periphery 94 to minimize the passage of impurities into the sump for return to the container through intake line 50. Of particular significance in reducing filter by-pass is the cooperative relationship of sealing ridges 22 and the overlying filter paper portion.

It is to be observed that sump 30 defines a volume which is very small indeed. All of the filtrate flows downwardly into the sump and virtually all of the filtrate may then be removed by the pump through intake line 50 because of the close proximity of the effective pump intake (grooves 84) to the bottom of the sump. That configuration is particularly advantageous where the filtrate is a material which is solid at ambient temperatures and it is therefore important to leave as little filtrate in the bowl as possible to prevent blockage upon reuse of the regenerating apparatus.

After the cooking oil is completely filtered and the filtrate completely withdrawn the pump is turned off and any filtrate remaining in the pump and in inlet and discharge lines drains into the sump whereby potential blockage of the pump and lines is eliminated. The regenerating apparatus may then be disassembled and cleaned, if necessary, or moved to a further container of cooking oil requiring regeneration for further use.

As used herein, the terms shortening and cooking oils are used interchangeably. Although oils may frequently be filtered at ambient temperatures, shortenings are usually solid at such temperatures and therefore must be filtered while hot. The filtering apparatus of this invention is, of course, adapted for filtering hot cooking oils as well as those which may be filtered at ambient temperatures.

Although only one embodiment of a filtering apparatus of this invention has been illustrated and described, it will be apparent to those skilled in the art that modifications may be made in accordance with this invention without departing from the spirit and scope thereof. The invention should therefore be construed in accordance with the claims which follow.

We claim:

1. A filtering apparatus for removing impurities from a liquid comprising a filtering bowl, said bowl comprising a base and side walls, a pump and a removable filtering assembly, said removable filtering assembly being connected to said pump by a releasable fitting means, said filtering assembly comprising an intake nut defining fluid channels adjacent its lowermost portion and a coupling nut for releasably clampingly and centrally engaging a filter screen and filtering paper therebetween and only at the centers of said filter screen and said filtering paper, said filtering assembly further comprising a standpipe assembly releasably connectable to said releasable fitting means, said removable filtering assembly defining a fluid passage from said lowermost portion of said intake nut through said standpipe, said filter screen and said bowl base defining a suction chamber therebetween, and said bowl defining an annular shoulder adjacent its side and an inner continuous annular sealing ridge whereby portions of said filtering paper overlie both of said annular shoulder and said sealing ridge.

2. The filtering apparatus of claim 1 in which said removable filtering assembly includes a compression ring biasing said filter paper toward said annular shoulder whereby said filter paper is sealingly draped over said sealing ridge.

3. A filtering apparatus for removing impurities from cooking oils comprising a filtering bowl, a removable filtering assembly and a suction pump, said filtering apparatus having only one filtering screen, said screen being secured to said filtering assembly only centrally thereof, said bowl comprising side and bottom walls, said removable filtering assembly including a filter paper of a larger size than said filtering screen, said filtering screen defining with said bowl bottom wall a vacuum chamber from which a filtrate may be drawn upwardly through a fluid passage in said filtering apparatus by said suction pump, said bowl defining an upstanding annular sealing means intermediate the periphery of said filtering screen and said bowl side wall over which an edge portion of a filter paper may be sealingly draped.

4. In a filtering apparatus for removing impurities from cooking oils and the like, an open-topped filtering bowl including a base wall defining a centrally located depending sump having an imperforate floor, a filter screen supported peripherally on said imperforate floor above said sump and adjacent the periphery of said bowl, an upstanding intake pipe defining an axial bore, pump means for drawing fluid upwardly through said bore, an intake chamber comprising an enlarged intake means in flow communication with the lower-most end of said pipe in said sump, said intake means having a lower face in confronting relation to the upper face of said sump floor and defining a bore in flow communication with the intake pipe bore, said intake means defining a plurality of generally radial grooves adjacent its lower face and confronting the upper face of said sump floor, said sump floor upper face and said intake means lower face defining with said grooves a plurality of discrete inwardly extending channels for the passage of fluid adjacent said intake means from said sump into the bore of said intake pipe when said filtering apparatus is in use.

5. In a portable filtering apparatus for removing impurities from cooking oils and the like, a cylindrical bowl having a contoured base, an upstanding side wall and an open top, said contoured base being imperforate and defining a depending sump at its center, a filter plate and a filter paper overlying said filter plate, a shelf in said contoured base adjacent the base side wall, said filter plate being supported upon said shelf at the periphery of said filter plate, the remainder of said filter plate defining, with said contoured base, a vacuum chamber, suction means, said suction means including a suction pump, a nut means depending into said sump and defining channels for the passage of fluid from said sump into said nut means, said nut means being fixedly connected to the bottom of said filter plate adjacent the center of said filter plate, and a clamping means overlying said filter plate at its center and being releasably secured to and in flow communication with said nut means for clampingly engaging the center of said filter plate therebetween, handle means secured to said clamping means, said clamping means defining a central axial bore in flow communication with the channels in said nut means and in flow communication with an upstanding pipe secured thereto, said pipe being in flow communication with said suction pump, whereby fluid is drawn upwardly from said sump to said suction pump.

References Cited

UNITED STATES PATENTS

| | | | |
|---|---|---|---|
| 1,530,845 | 3/1925 | Milkey | 210—416 X |
| 2,477,404 | 7/1949 | Butt | 210—416 X |
| 2,760,641 | 8/1956 | Mies et al. | 210—416 X |
| 2,760,645 | 8/1956 | Mies | 210—254 |
| 3,295,686 | 1/1967 | Krueger | 210—455 |

REUBEN FRIEDMAN, *Primary Examiner.*

J. ADEE, *Assistant Examiner.*